Patented Oct. 25, 1932

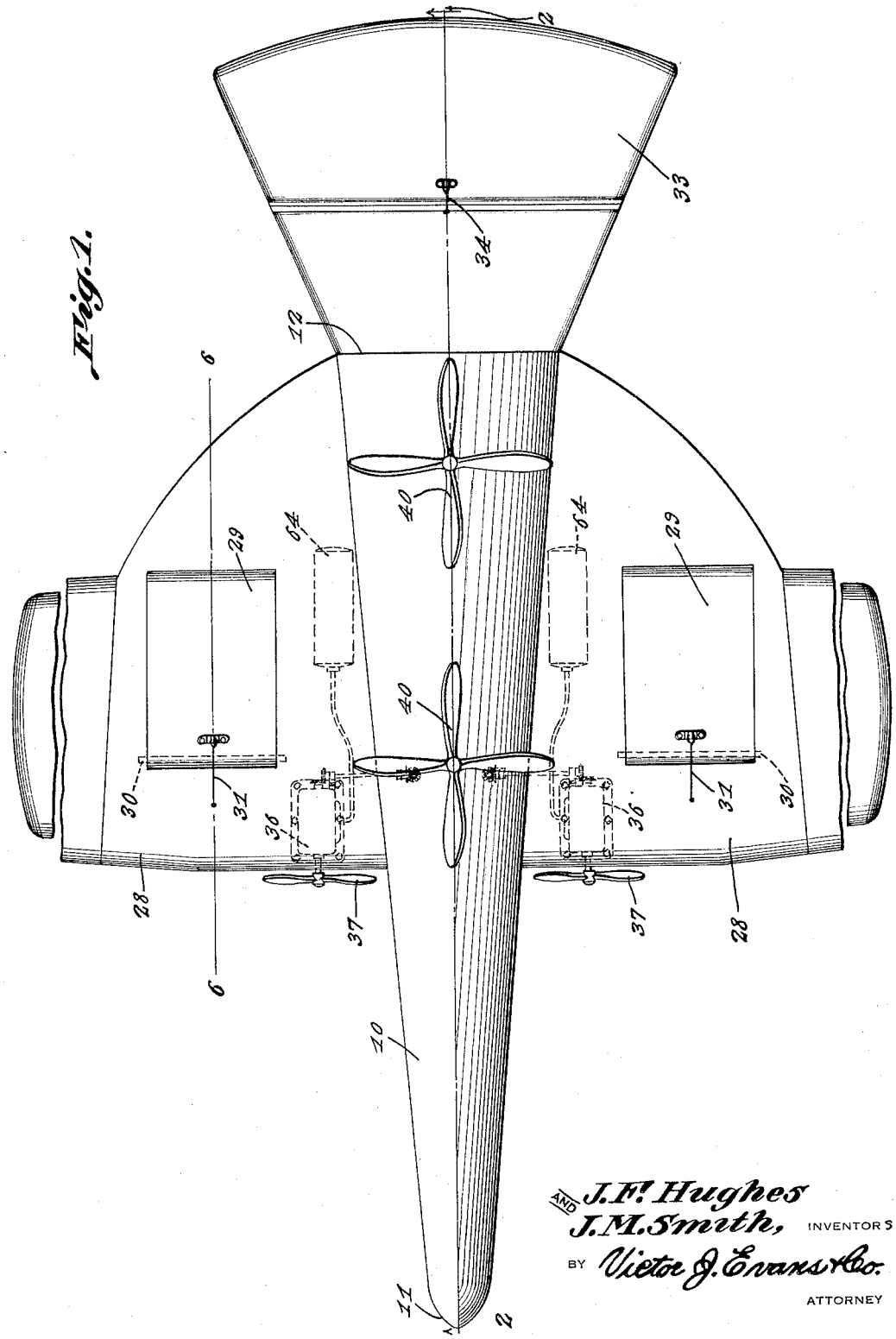

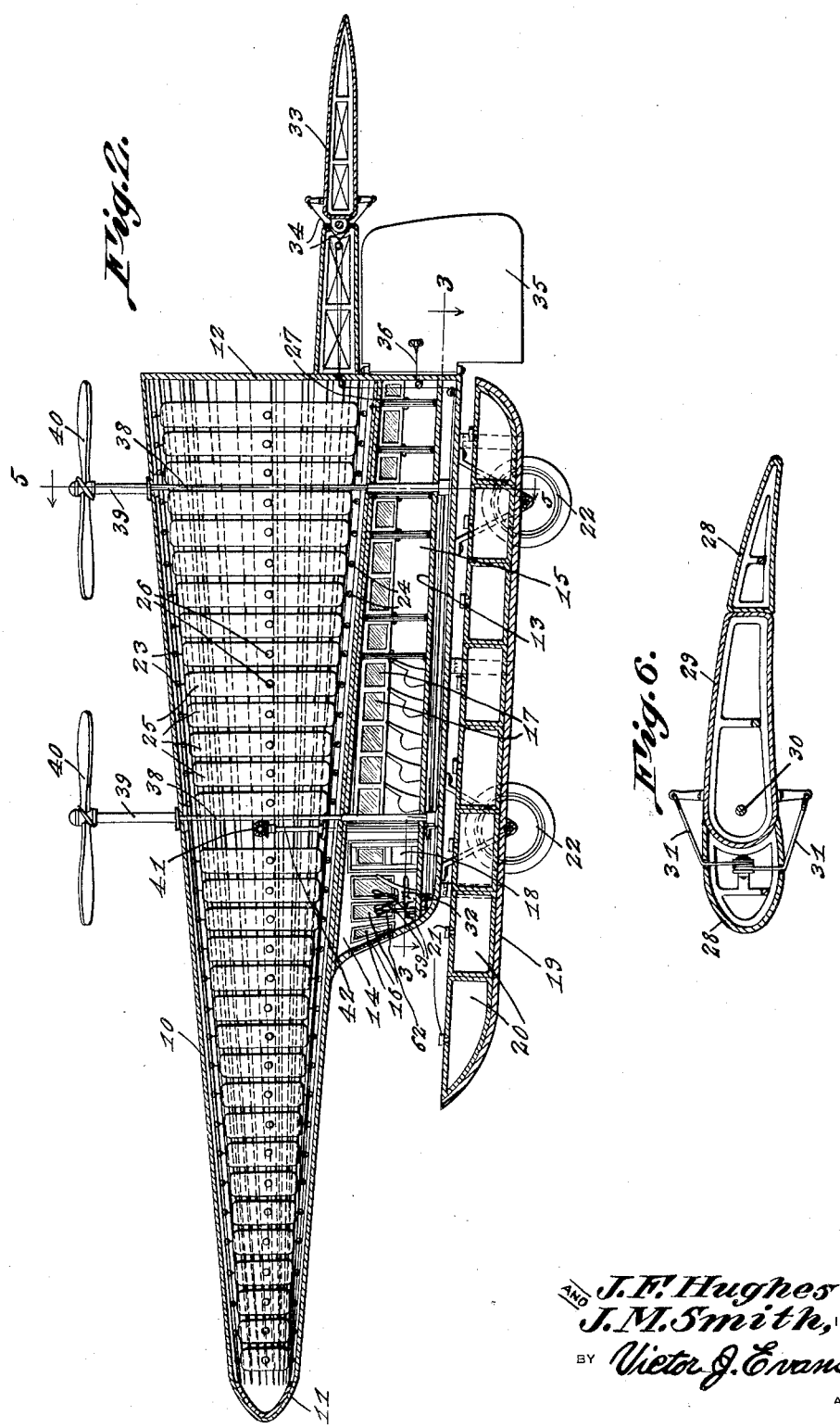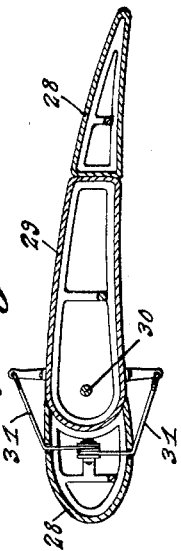

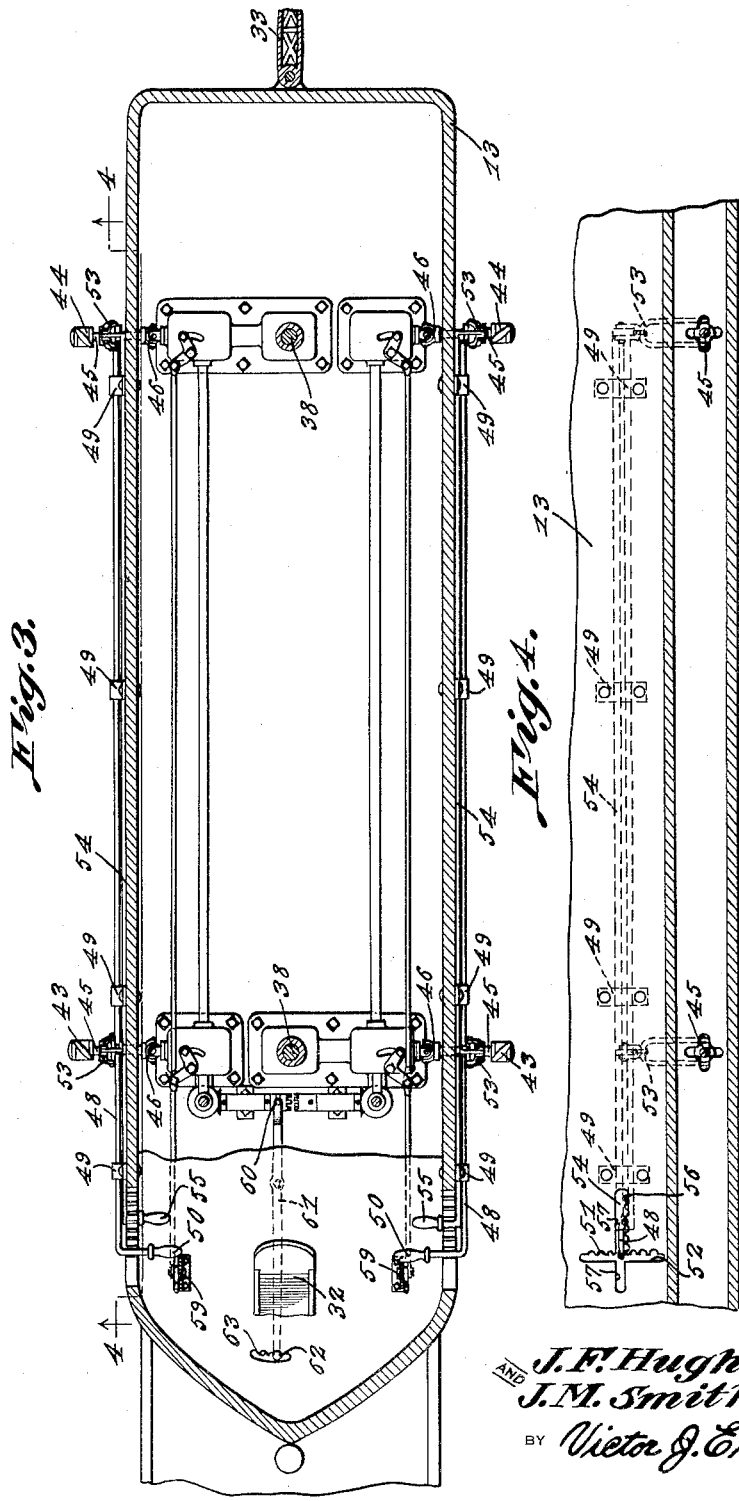

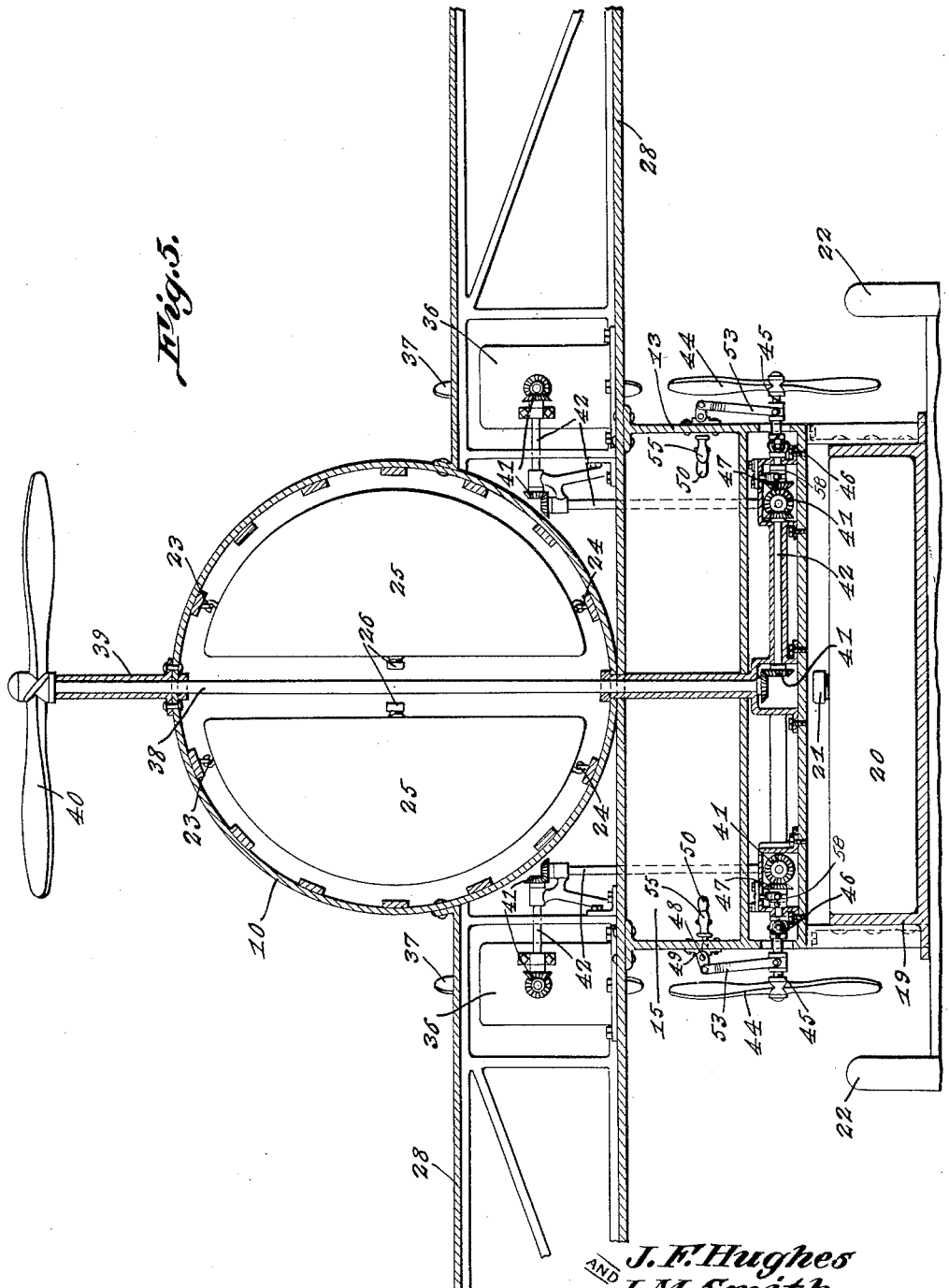

1,884,706

UNITED STATES PATENT OFFICE

JOSEPH FREAMON HUGHES AND JOHN MURRAY SMITH, OF SMACKOVER, ARKANSAS

AIRCRAFT

Application filed January 4, 1932. Serial No. 584,680.

The invention relates to an aircraft and more especially to a semi-dirigible.

The primary object of the invention is the provision of a craft of this character wherein the same is rendered buoyant by the arrangement of detachable gas cells held within a substantially bullet-shaped balloon section so that the craft can make ascent and descent in substantially a perpendicular path and by its construction it can land upon water or ground with perfect safety and the buoyancy of the craft will assure easy travel aloft with safety to the pilot, passengers, mail, express or anything which might be aboard.

Another object of the invention is the provision of a craft of this character wherein multiple power units are employed for driving propellers which serve to give flight and also travel in flying direction, the propellers being readily controllable so that the same may be rendered active or inactive at the option of the pilot of the craft, the latter being of novel construction to assure safe flight and also ascent and descent, the descent being made in substantially a perpendicular plane for landing without any appreciable surface travel, thus the craft may be brought to a landing upon vessels and also upon water or land.

A further object of the invention is the provision of a craft of this character wherein in bringing the same to a landing it may be glided for a long distance or descend in a substantially perpendicular path and without liability of tail spin or crash, the cabin of the craft being of a construction for the housing of a pilot, passengers, express or anything to be transported by airplane, the control of the craft being at the command of the pilot for easy maneuvering of such craft in flight or during ascent or descent and with assurance of safety to those aboard.

A still further object of the invention is the provision of a craft of this character which is comparatively simple in construction, thoroughly reliable and efficient in its purposes, strong, durable, neat and attractive in appearance, readily and easily controlled with dispatch, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a mutilated top plan view of the craft constructed in accordance with the invention.

Figure 2 is a sectional view on the line 2—2 of Figure 1 looking in the direction of the arrows.

Figure 3 is a sectional view on the line 3—3 of Figure 2 looking in the direction of the arrows.

Figure 4 is a fragmentary sectional view on the line 4—4 of Figure 3 looking in the direction of the arrows.

Figure 5 is a fragmentary sectional view on the line 5—5 of Figure 2 looking in the direction of the arrows and on an enlarged scale.

Figure 6 is a sectional view on the line 6—6 of Figure 1.

Similar reference characters indicate corresponding parts throughout the several views in the drawings.

Referring to the drawings in detail, the aircraft which is of semi-dirigible type comprises a hollow substantially bullet-shaped balloon body 10 having the pointed ends 11 and flat closed rear or aft end 12 respectively, while arranged beneath the rear portion of this body 10 is a cabin 13 provided with a fore pilot's quarters 14 and an aft passenger and carriage quarters 15, this being arranged to accommodate passengers as well as mail, express or anything for carriage by the craft, both quarters being fitted with windows 16 and 17 respectively and suitable doors 18 for access thereto and exit therefrom.

Beneath the cabin 13 is a boat-like float body or pontoon 19 having suitably arranged therein buoyant tanks 20, each being adapted to contain helium gas or other lighter than air medium and the same is charged or filled at the cap filling point 21 and such float or pontoon 19 is usable for water landing of the craft. Associated with the float or pontoon 19 and suitably mounted beneath the cabin 13 is a wheeled landing gear 22 usable for ground landing of the craft.

Located within the body 10 are upper and lower hangers 23 and 24 respectively, these being adapted for the detachable mounting of gas filled bags or cells 25 which in their series increase in size throughout the extent of said body 10 from the fore to the aft ends thereof, the smaller bags being placed in the smaller end of said body and then successively the increasing sized bags are hung therein to the larger or aft end of said body. It is preferable to have independent series of bags or cells 25, these arranged in opposed rows within the body 10 as is clearly shown in Figures 2 and 5 of the drawings. The bags or cells 25 are introduced beginning at the smaller end of the body in independent pairs and each pair when hung is supplied with helium gas or other lighter than air medium through the cap filling point 26, the bags or cells being normally collapsed and devoid of gas or like medium and such bags or cells are carried from the cabin 14 into the body 10 through a hatchway 27 establishing communication between the said cabin at its rear end and the body 10 at the aft portion thereof. The bags or cells 25 are introduced and inflated with a gas or other like medium of a number to render the craft buoyant accordingly to the weight of the load to which it may be subjected. The buoyancy of such craft is increased or decreased accordingly to the increased or decreased weight of load.

Extending laterally of the body 10 at an intermediate point of its length are the side stabilizing planes 28, these having arranged thereon ailerons 29 which are vertically adjustable upon pivots 30 and the adjustment is had through operating cables 31 connected with a suitable control within the pilot's quarters 14 within the cabin 13 and such control being within convenient reach of a pilot when occupying the pilot seat 32.

Located rearwardly of the craft is the vertically swinging elevating plane 33, the latter being controllable by cables 34 operable from a control within the pilot's quarters 14, this control being within convenient reach of the pilot and 35 is the rudder mounted at the rear end of the craft and operable by a cable 36 from a control within the pilot's quarters 14.

At opposite sides of the longitudinal axis of the craft and confined within the stabilizer planes 28 are suitable power units such as motors 36, these operating propellers 37 arranged forwardly of the leading edges of the planes 28 while journaled vertically at the longitudinal center of said craft are driven shafts 38 which extend upwardly through vertical columnar bearings 39 above the body 10 and carry horizontal propellers 40 which constitute the lifting propellers for the craft. These propellers 40 are arranged in the same plane and are spaced from each other, the shafts 38 therefor being driven through trains of gears 41 and shafts 42 from the motors 36 as will be clearly apparent.

Located fore and aft at opposite sides of the cabin 13 near the bottom thereof are the front and rear propellers 43 and 44 respectively, their shafts 45 through the universal joint 36 and the gears 47 are connected with the gears 41 and shafts 42 for power transmission from the motors 36 to said propellers 43 and 44 respectively. The universal joint 36 permits angular adjustment both vertically and horizontally to each shaft 45 and the vertical adjustment is had through manipulation of a rocking shift rod 48 supported in hangers 49 externally on the cabin 13, the rod 48 at one end being formed with a crank handle 50 extended within the cabin for convenient reach of the pilot and is releasably engageable with a rack 51 formed at the edge of the opening or slot 52 for a clearance for the crank handle 50 and its projection within the pilot's quarters 14 of the cabin 13. The rod 48 operates the swivel connection 53 with the shafts 45 so that by operating the hand crank 50 these shafts 45 can be angularly adjusted vertically.

Slidably fitted in the hangers 49 at each side of the cabin 13 externally thereof is a shift bar 54 which is operatively associated with the swivel connections 53 so that the shafts 45 can be angularly adjusted in a horizontal path or longitudinally of the craft by shifting the bar 54, the latter being formed with a handle 55 extended within the pilot's quarters 14 of the cabin 13 in convenient reach and this handle engages a rack 56 formed in the way 57 in each side of the cabin 13 for the said handle 55, thus it being seen that the propellers 43 and 44 may be angularly disposed both in vertical and horizontal paths.

Associated with the gear connections 47 for the shafts 45 are throw clutches 58 which when actuated render the propellers 43 and 44 at each side of the cabin 13 active or inactive, the throw clutches 58 being operable from controls 59 within the pilot's quarters 14 in convenient reach of a pilot.

Associated with the power units or motors 36 for the transmission of power from one or the other to the propellers 40, 43 and 44 there is provided a throw clutch 60 which is arranged in the train of gears 41 and shafts 42 so that in event that either motor or power unit 36 becomes dead the active power unit or motor can be manually thrown into action by the shifting of the clutch 60 through the throw lever 61 in convenient reach of the pilot within the pilot's quarters 14 for the transmission of power from this active unit or motor to the said propeller for the driving thereof, the throw lever 61 having its handle end 62 operative with a rack 63 for holding such lever 61 in its thrown or adjusted position.

The motors or power units 36 each has connected therewith a fuel supply source 64, the same being located preferably within the plane 28 having the motor or power unit therein and such source 64 can be replenished with fuel in any desirable manner.

It is of course understood that in the use of the aircraft for the driving of its propellers but a single power unit or motor is active and should such power unit or motor become dead or unsuitable for use then the second or other power unit or motor can be rendered active or brought into use by the shifting of the clutch 60 for this purpose.

The working of the aircraft under the construction before described will be clearly obvious and therefore a more extended explanation has been omitted but it is of course understood that changes, variations and modifications may be made in the structure as come properly within the scope of the appended claims without departing from the spirit of the invention or sacrificing any of its advantages.

What is claimed is:—

1. An aircraft of the kind described comprising a substantially bullet-shaped hollow body forming a gas bag, a plurality of buoyant cells removably hung within said body, side planes projected laterally from the body and having adjustable ailerons, an elevating plane rearwardly of said body, a tail rudder rearwardly of said body, a cabin beneath said body and side planes, a float beneath the cabin, a wheel landing gear associated with said cabin, vertically and horizontally arranged propellers, the vertically arranged propellers being arranged at opposite sides of the cabin and angularly adjustable vertically and horizontally, means for adjusting the vertically arranged propellers, and plural power units independently connected for driving said propellers.

2. An aircraft of the kind described comprising a hollow body forming a gas bag, a plurality of buoyant cells removably hung within said body, side planes projected laterally from the body and having adjustable ailerons, an elevating plane rearwardly of said body, a tail rudder rearwardly of said body, a cabin beneath said body and side planes, a float beneath the cabin, a wheel landing gear associated with said cabin, vertically and horizontally arranged propellers, the vertically arranged propellers being arranged at opposite sides of the cabin and angularly adjustable vertically and horizontally, means for adjusting the vertically arranged propellers, plural power units independently connected for driving said propellers, and means for alternately connecting said power units with said propellers.

3. An aircraft of the kind described comprising a substantially bullet-shaped hollow body forming a gas bag, a plurality of buoyant cells removably hung within said body, side planes projected laterally from the body and having adjustable ailerons, an elevating plane rearwardly of said body, a tail rudder rearwardly of said body, a cabin beneath said body and side planes, a float beneath the cabin, a wheel landing gear associated with said cabin, vertically and horizontally arranged propellers, the vertically arranged propellers being arranged at opposite sides of the cabin and angularly adjustable vertically and horizontally, means for adjusting the vertically arranged propellers, plural power units independently connected for driving said propellers, means for alternately connecting said power units with said propellers, and means for independently controlling the ailerons, elevating plane and rudder.

4. An aircraft of the kind described comprising a substantially bullet-shaped hollow body forming a gas bag, a plurality of buoyant cells removably hung within said body, side planes projected laterally from the body and having adjustable ailerons, an elevating plane rearwardly of said body, a tail rudder rearwardly of said body, a cabin beneath said body and side planes, a float beneath the cabin, a wheel landing gear associated with said cabin, vertically and horizontally arranged propellers, the vertically arranged propellers being arranged at opposite sides of the cabin and angularly adjustable vertically and horizontally, means for adjusting the vertically arranged propellers, plural power units independently connected for driving said propellers, means for alternately connecting said power units with said propellers, means for independently controlling the ailerons, elevating plane and rudder, and a plurality of buoyant elements located within the float.

5. An aircraft of the kind described comprising a substantially bullet-shaped hollow body forming a gas bag, a plurality of buoyant cells removably hung within said body, side planes projected laterally from the body and having adjustable ailerons, an elevating plane rearwardly of said body, a tail rudder rearwardly of said body, a cabin beneath said body and side planes, a float beneath the cabin, a wheel landing gear associated with said cabin, vertically and horizontally arranged propellers, the vertically arranged propellers being arranged at opposite sides of the cabin and angularly adjustable vertically and horizontally, means for adjusting the vertically arranged propellers, plural power units independently connected for driving said propellers, means for alternately connecting said power units with said propellers, means for independently controlling the ailerons, elevating plane and rudder, a plurality of buoyant elements located within the float, and operative propellers arranged forwardly of the leading edge of the side planes and operated by any one of the power units.

6. An aircraft of the kind described comprising a substantially bullet-shaped hollow body forming a gas bag, a plurality of buoyant cells removably hung within said body, side planes projected laterally from the body and having adjustable ailerons, an elevating plane rearwardly of said body, a tail rudder rearwardly of said body, a cabin beneath said body and side planes, a float beneath the cabin, a wheel landing gear associated with said cabin, vertically and horizontally arranged propellers, the vertically arranged propellers being arranged at opposite sides of the cabin and angularly adjustable vertically and horizontally, means for adjusting the vertically arranged propellers, plural power units independently connected for driving said propellers, means for alternately connecting said power units with said propellers, means for independently controlling the ailerons, elevating plane and rudder, a plurality of buoyant elements located within the float, operative propellers arranged forwardly of the leading edge of the side planes and operated by any one of the power units, and means for rendering the first named vertical propellers operative or inoperative at either side of the cabin.

In testimony whereof we affix our signatures.

JOSEPH FREAMON HUGHES.
J. MURRY SMITH.